US005627721A

United States Patent [19]

Figueiredo et al.

[11] Patent Number: 5,627,721

[45] Date of Patent: May 6, 1997

[54] PROTECTOR CARTRIDGE FOR MODULAR CONNECTOR BLOCKS

[75] Inventors: Antonio A. Figueiredo, Belleville; Adam S. Kane, Morristown; Jeremia P. Starace, Nutley, all of N.J.

[73] Assignee: Lucent Technologies Inc., Murray Hill, N.J.

[21] Appl. No.: 502,522

[22] Filed: Jul. 14, 1995

[51] Int. Cl.[6] .......... H02H 3/22

[52] U.S. Cl. .......... 361/119; 361/56; 361/111; 361/824

[58] Field of Search .......... 361/119, 56, 111, 361/91, 118, 127, 823, 824, 728, 729, 731

[56] References Cited

U.S. PATENT DOCUMENTS

| | | | |
|---|---|---|---|
| 4,584,624 | 4/1986 | Hines | 361/119 |
| 4,603,377 | 7/1986 | Mobayashi et al. | 361/824 |
| 4,800,587 | 1/1989 | Kupferschmidt | 361/119 |

*Primary Examiner*—Jeffrey A. Gaffin
*Assistant Examiner*—Stephen W. Jackson

[57] ABSTRACT

A surge protection cartridge adapted for use with a double-sided modular connector block system. The protector cartridge advantageously mounts in the front or rear of a connector module of the connector block in a variety of orientations in order to protect an entire row of terminations on the block. Two L-shaped brackets adapted to couple to a mounting bracket of the connector block form an internal ground bus within the protector cartridge. The brackets include a series of cantilever connecting clips which couple directly to the surge protection devices. Spring contacts having similar cantilever clips couple the remaining leads of the surge protection devices and the terminals of the connecting block which are to be protected. Each individual spring contacts is seated within an individual insulated well of the cartridge housing. The feature maintains a substantial insulation resistance between adjacent terminals of the housing and advantageously prevents shorting between adjacent terminal leads caused by the collection of moisture. A set of protrusions within the cartridge housing corresponding to the wells engage the spring contacts to force correct seating position. An exclusion feature attached to the cartridge housing ensures that only protection cartridges having a sufficient number of protection devices may be inserted within certain sized connector modules.

20 Claims, 11 Drawing Sheets

PROTECTOR CARTRIDGE FOR MODULAR CONNECTOR BLOCKS

FIELD OF THE INVENTION

The present invention relates to connecting blocks for terminating telephone circuit wires, and more particularly to a protection device for providing voltage limiting protection for circuits terminated at the connecting block.

BACKGROUND OF THE INVENTION

Individual pairs of telephone circuit wires are frequently terminated in telephone company central offices and customer premise locations utilizing multi-terminal connector blocks. Once terminated, these telephone circuit wires, usually comprised of narrow gauge insulated copper cables, are grouped and then rerouted for appropriate distribution of the calls which they carry. Single connector blocks normally accommodate anywhere from 60 to 100 pairs of densely packed terminations, wherein multiple connector blocks are frequently contained in close proximity at a single location, e.g., one wall of a telephone switching room. Efficient utilization of mounting space is thus required since space within utility locations is traditionally at a premium.

Besides the incoming circuit terminations, the connector blocks are also utilized for making cross-connections from individual circuits on the connector blocks, as well as for the mounting of current and voltage limiting circuit protection used to prevent damage caused by lightening and other external forces. As is known, circuit protection devices which provide both current and voltage limiting circuit protection are polarity sensitive with respect to the individual pairs of wires being protected. Thus, when a double sided connecting block is utilized, wherein common pairs of terminals are included on both the from and rear of the connecting block, circuit protection devices adapted for installation on the front side of the connecting block are generally not compatible to provide circuit protection on the rear of the connecting block because the polarity will be reversed. Erroneous installation of a front circuit protection device in the rear of a connecting block and/or installation of a rear protection device in the from of a connecting block may render the communications circuit inoperable, or at the very least, improperly protected.

Voltage-only protectors, on the other hand, are not generally polarity sensitive, since with this type of protection, the protection device need not be placed in series within the circuit to be protected. As such, a somewhat greater amount of flexibility may be available for mounting schemes using voltage-only protection.

In order to take full advantage of the potential added flexibility available for voltage-only surge protection mounting, it is an object of the present invention to provide a protection device which is adaptively mountable in a variety of orientations in both the front and rear of a double-sided connecting block. It is a further object of the present invention to provide a device which has superior insulation resistance characteristics for the insulation between adjacent terminals.

SUMMARY OF THE INVENTION

The present invention is a surge protection cartridge adapted for use with a double-sided modular connector block system. The protector cartridge advantageously mounts in the front or rear of a connector module of the connector block in a variety of orientations in order to protect an entire row of terminations on the block. The device is assembled from a minimal amount of individual components to thereby increase manufacturing efficiency.

Two L-shaped ground brackets adapted to easily couple to a mounting bracket of the connector block form an internal ground bus within the protector cartridge. The brackets include a series of cantilever connecting clips which couple directly to surge protection devices. Spring contacts having similar cantilever clips couple the remaining leads of the surge protection devices and the terminals of the connecting block which are to be protected. Each individual spring contact is seated within an individual insulated well of the cartridge housing. The feature maintains a substantial insulation resistance between adjacent terminals of the housing and advantageously prevents shorting between adjacent terminal leads caused by the collection of moisture. A set of protrusions within the cartridge housing corresponding to the wells engages the spring contacts to force a correct seating position. An exclusion feature attached to the cartridge housing ensures that only protection cartridges having a sufficient number of protection devices may be inserted within the same or smaller sized connector modules.

BRIEF DESCRIPTION OF THE FIGURES

For a better understanding of the present invention, reference may be had to the following description of exemplary embodiments thereof, considered in conjunction with the accompanying drawings in which.

DETAILED DESCRIPTION OF THE DRAWINGS

Figure 1:
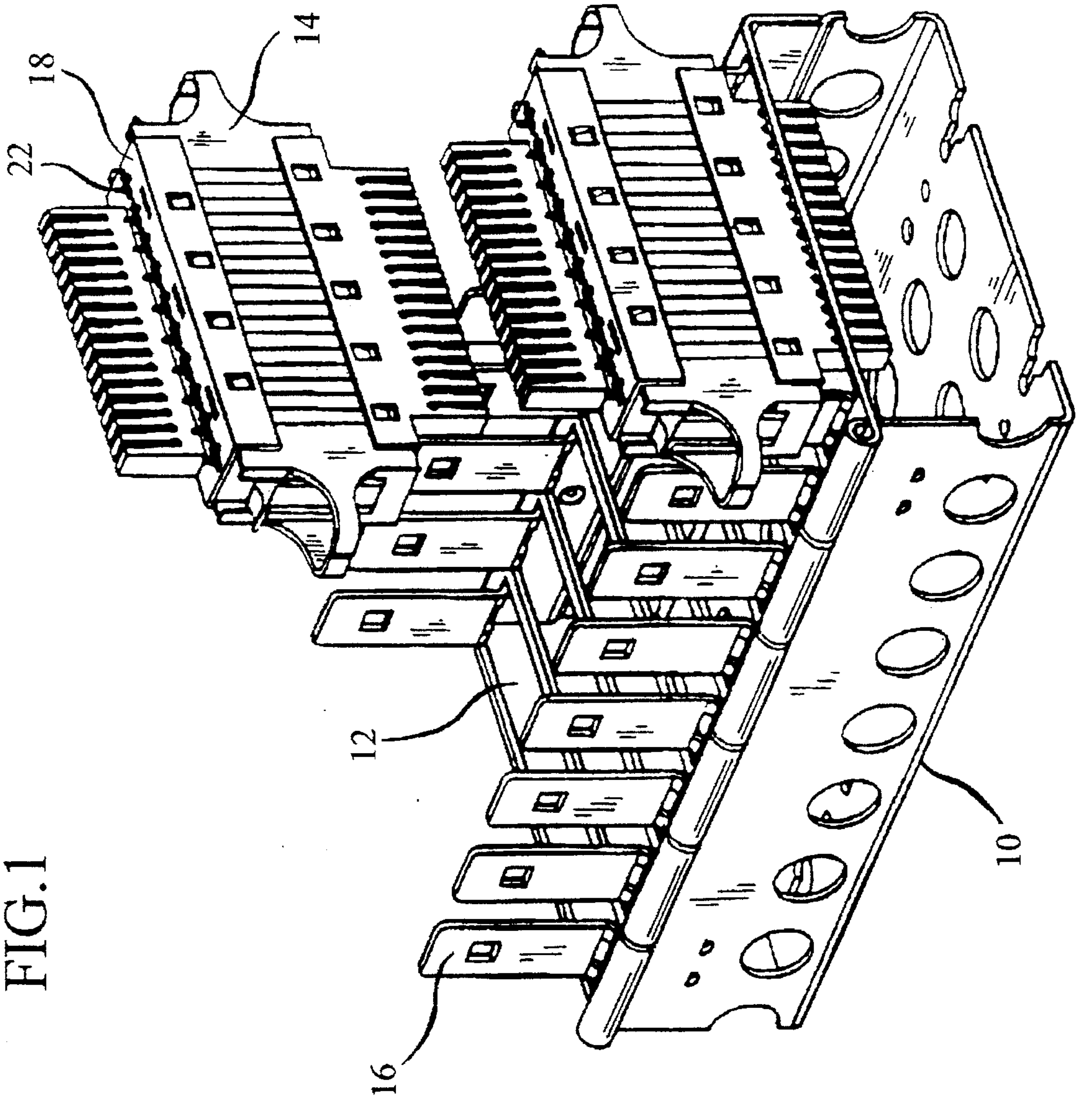
FIG. 1 shows a perspective view of one preferred embodiment of a connector module and mounting bracket used with the present invention protector cartridge.

The present invention is a surge protector cartridge intended for use in a modular connecting block system of the type shown in FIG. 1. A mounting bracket 10 is shown in FIG. 1 having a plurality of receptacle slots 12. Connector modules 14 are mountable within the receptacle slots 12 between support posts 16 of the mounting bracket 10. Each of the connector modules includes multiple terminals, for example, IDC terminals on the front and rear sides thereof. Placement of multiple connector modules 14 within the mounting bracket 10 enables the creation of a double-sided connecting block.

The mounting bracket 10 as shown in FIG. 1 is hinged in order to allow easy access to both the front and rear of the connecting block. The connector modules 14 of FIG. 1 are shown with terminal caps 18 on the front and rear of the modules. The terminal caps 18 act to protect the IDC terminals and the connections made thereto from handling. The terminal caps 18 (and the connector modules) include centrally located apertures 22 which are adapted to receive leads extending from the protector cartridges, as will be explained. For a more detailed description of the connector module and the mounting bracket of the modular connecting block system, see related patent applications entitled Mounting Of Protectors In Connector Blocks and Common Insulating Housing For Elements Of Varying Terminals, which have been incorporated herein by reference.

Figure 1A:
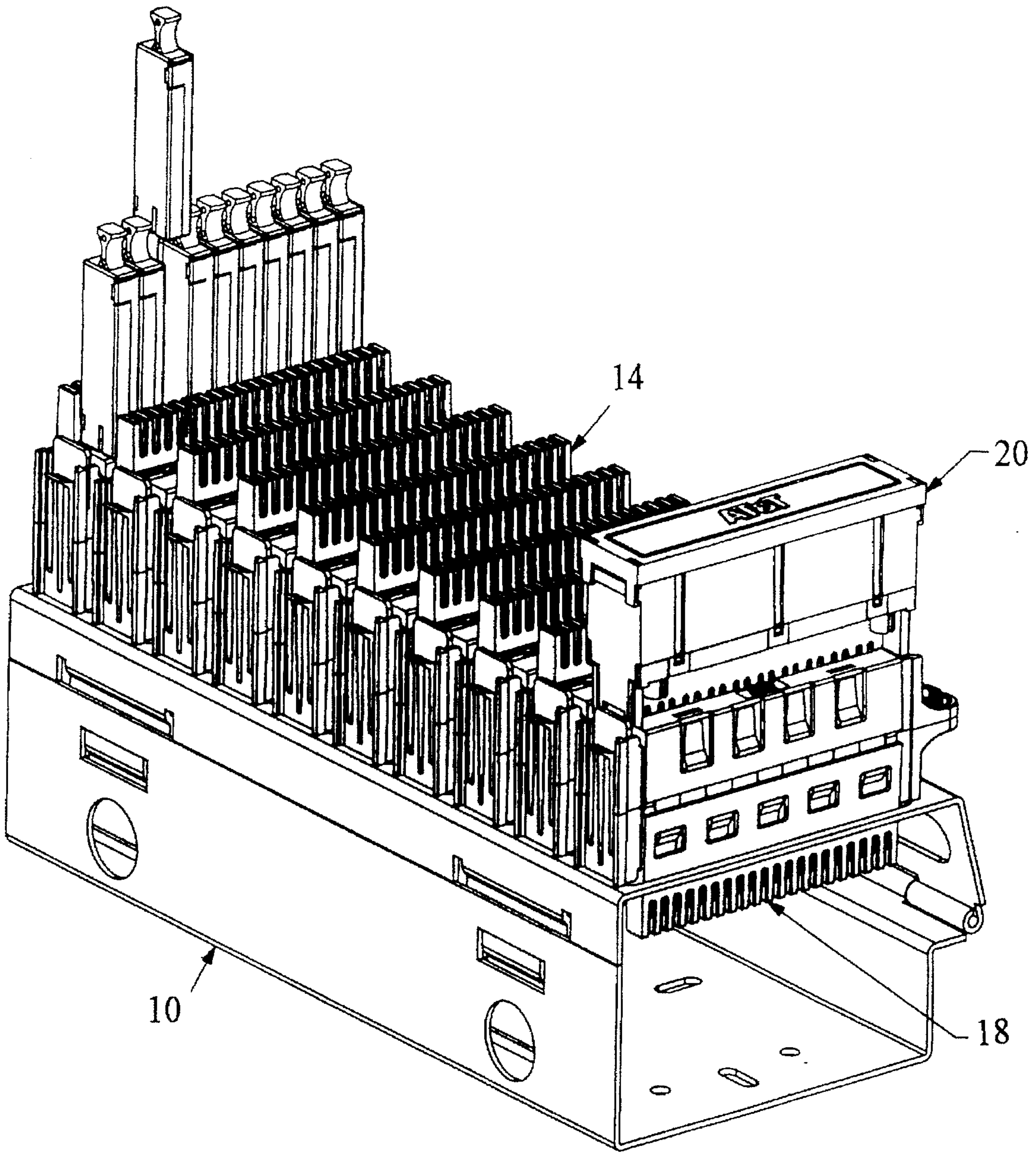
FIG. 1A shows a perspective view of one preferred embodiment of the present invention protector cartridge mounted within the from of a modular connecting block.
Figure 1B:
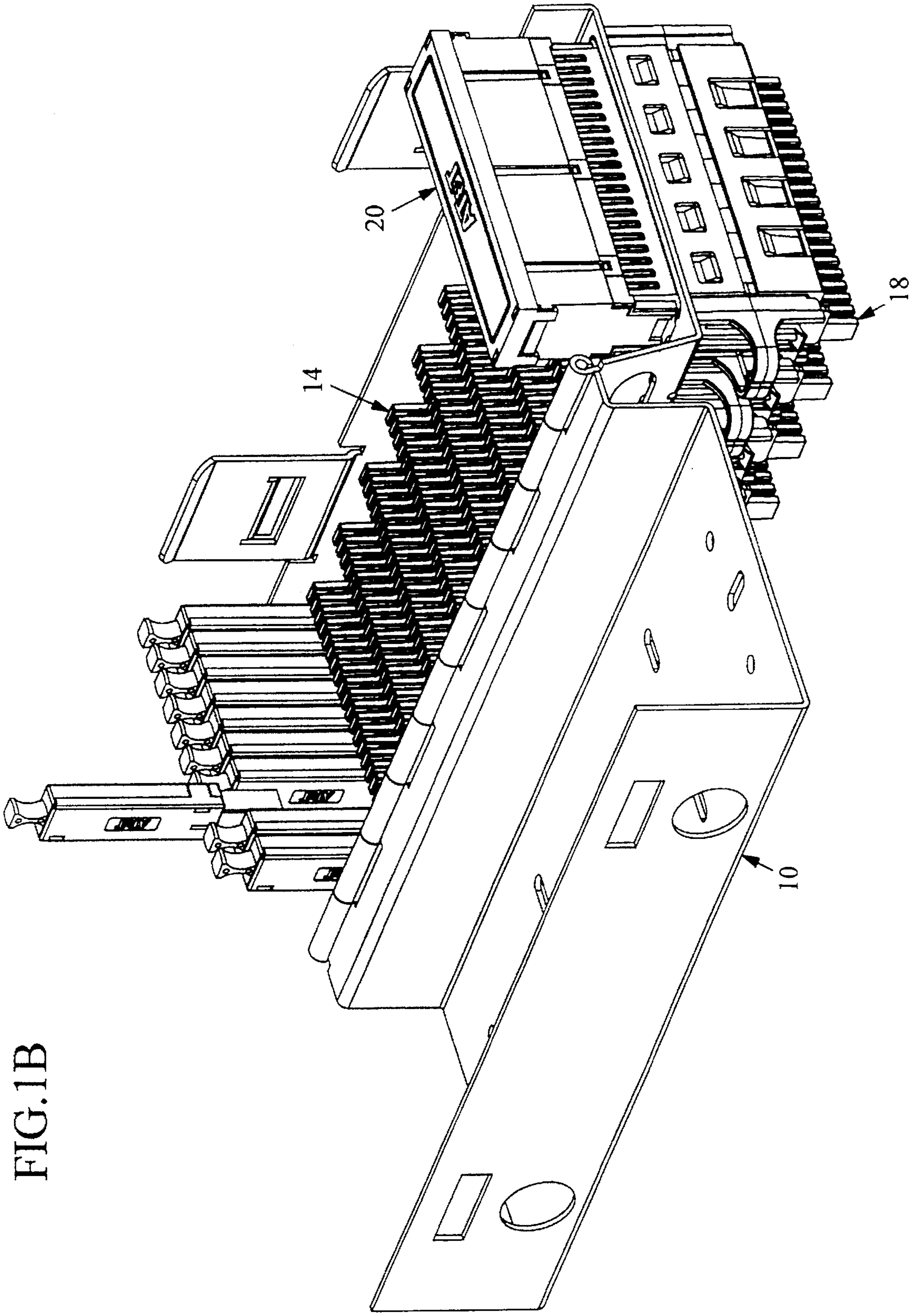
FIG. 1B shows a perspective view of one preferred embodiment of the present invention protector can be mounted within the rear of a modular connecting block.

Referring to FIGS. 1A and 1B in connection with one another, there is shown one preferred embodiment of the present invention protector cartridge 20 as it mounts within a connector module 14. As can be seen in each of the figures, the mounting bracket is filled with multiple connector modules 14 to thereby form a connecting block. The protector cartridge is mountable in the front or rear of a connecting module within the connecting block. FIG. 1A shows the protector cartridge 20 mounted within the front side of a connector module 20, whereas, FIG. 1B show the protector cartridge mounded within the rear of the connector module in the rear of the connecting block.

Figure 2:
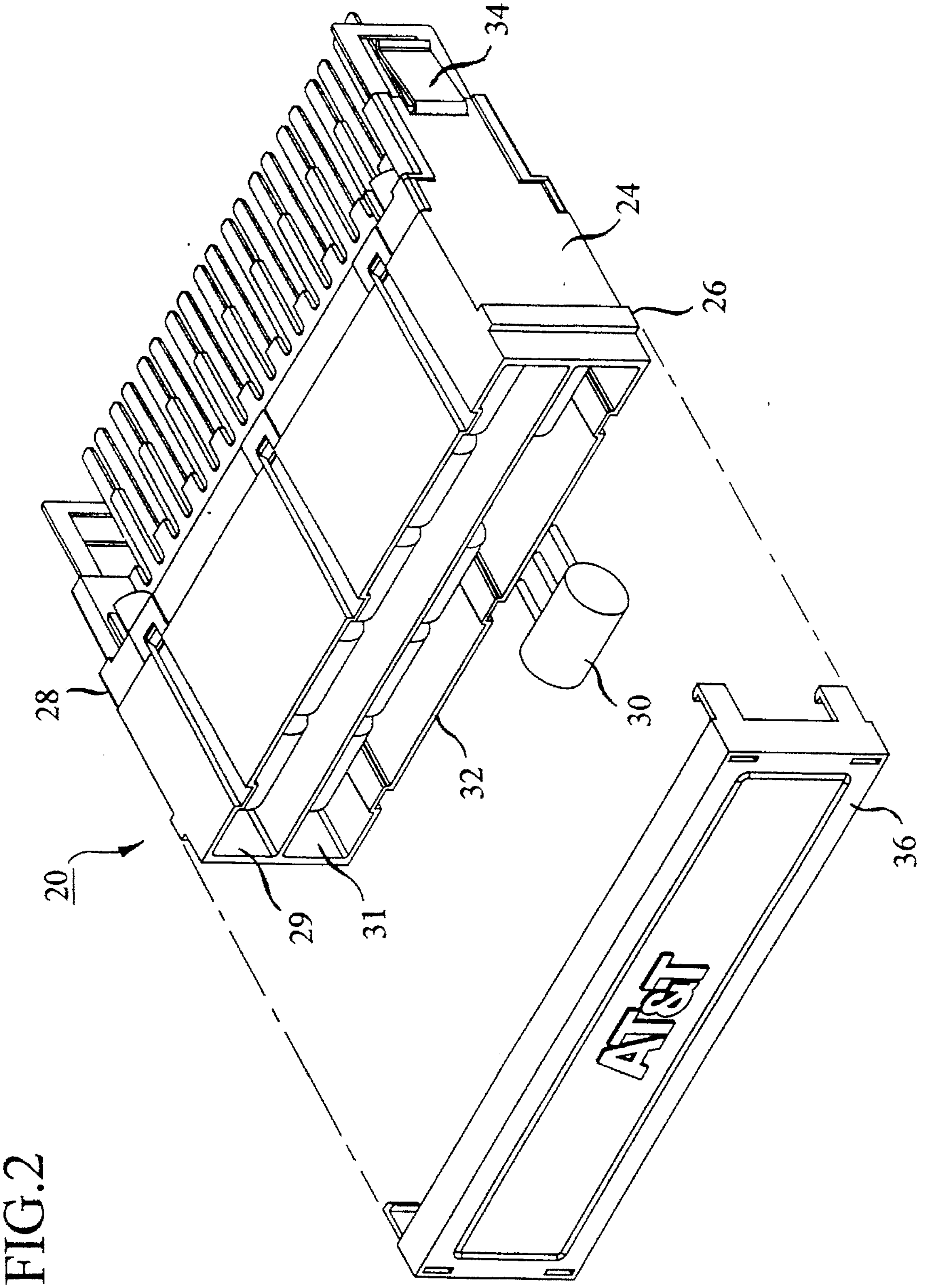
FIG. 2 shows a perspective view of one preferred embodiment of the present invention protector cartridge.

Referring to FIG. 2, there is shown one preferred embodiment of a protector cartridge 20 according to the present invention. The protector cartridge 20 is intended to provide voltage surge protection for an entire row of connectors, for example, 8 or 10 pairs of connectors, within a terminal block of connector modules. The cartridge includes a housing unit 24 comprised of an upper housing 26 and a lower housing 28 which are adapted to mate with one another. The upper housing 28 includes a first and second cavity 29, 31 adapted to receive circuit protection devices 30, for example, three terminal gas tubes, varistors or other solid state protection devices. As can be seen, the protection devices 30, once mounted within the housing, are located well below the top surface 32 of the housing 24. This provides the surge protection devices 30 with increased protection from handling while being mounted within the connector block. This is also an important safety feature in that any touching or snagging of clothing or other articles on the surge protection devices is prevented. Terminal leads of the protector cartridge are insertable into a connector module 14 where the terminal leads couple internally with the terminals of the connector module to thereby provide overvoltage protection for the entire row of connectors.

The protector cartridge 20 also couples to the mounting bracket 10 by way of metallic flaps 34 located on either side of the housing 24, which flaps connect to the support posts 16 of FIG. 1. The flaps 34 are internally coupled to a ground bus within the cartridge housing 24 to thereby provide an electrical discharge path through the mounting bracket. An optional cover 36 is also shown in FIG. 2 which is adapted to clip onto the upper housing 26 in order to cover the protection devices 30.

Since the present invention protection cartridge 20 is used as a voltage-only surge protector, the mounting orientation within the connector block need not be polarity specific. This is because the protection device need not necessarily be inserted in series within the circuit. Thus, to take full advantage of this added flexibility in mountability, the present invention protector cartridge 20 is adapted for mounting in either the front or rear of a connector module 14. Moreover, the protector cartridge is symmetrical about a vertical axis X and, as such, a 180 degree rotation in insertion of the cartridge is allowable. In other words, since the protector cartridge unit is entirely symmetrical, insertion orientation is of no concern, as long as the terminals of the protector cartridge seat within the apertures 22 of the connector module 14 shown in FIG. 1.

Figure 3:
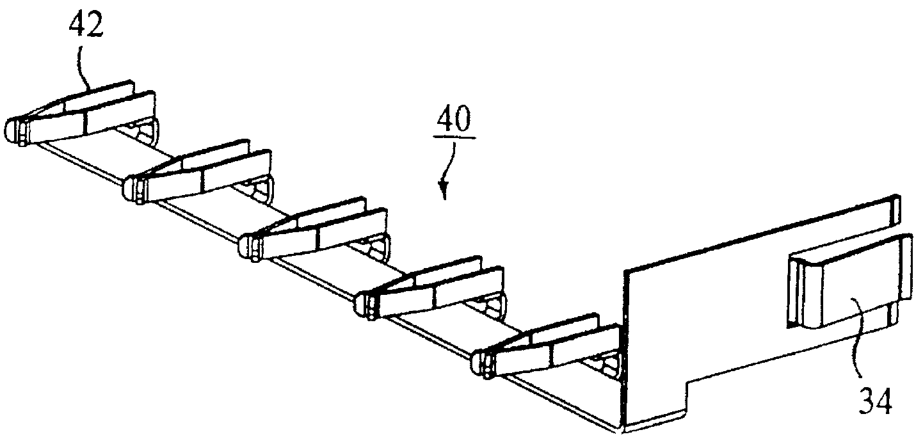
FIG 3 shows one preferred embodiment of a ground bracket used in the present invention protector cartridge.

Referring to FIG. 3, there is shown one exemplary representation of a ground bracket 40 used in the present invention protector cartridge 20. The ground bracket 40 is essentially an L-shaped member having a plurality of cantilever-type clips 42 coupled to a first section thereof. The cantilever clips 42 couple with the ground lead of the protection device to provide a minimum predetermined force, for example 1 lb., in a type of force fit. A flap section 34 of the ground bracket 40 couples with the mounting bracket 10, as mentioned previously, to provide an electrical discharge path for any surge which is received on a protected circuit. Two of the brackets 40 are assembled within the protector cartridge 20 opposite one another in order to form a rectangular ground bus. The ground bracket and cantilever clips 42 as shown comprise a unitary arrangement. By providing the bracket 40 as a unitary component assembly costs are significantly reduced in the manufacturing process since less parts need be assembled. As will be understood, of course, the cantilever clips 42 may also be enabled to be detachable from the ground bar to allow for simple replacement. The ground bus will be made from a suitable conductive material in order to provide an electrical discharge path in response to an electrical surge.

Figure 4A:
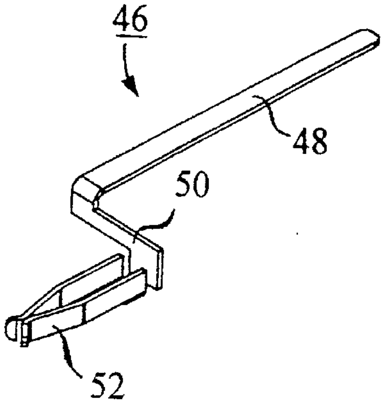
FIG. 4A shows one preferred embodiment of a spring contact used in the present invention protector cartridge.
Figure 4B:
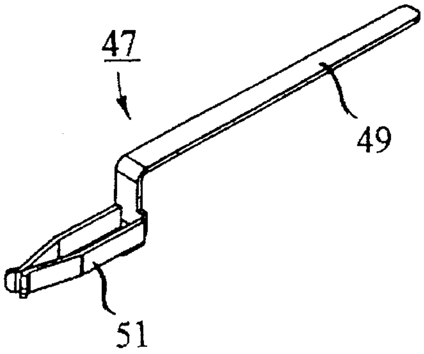
FIG. 4B shows a second embodiment of a spring contact used in the present invention protector cartridge.

Referring to FIG. 4A, there is shown an exemplary embodiment of a contact spring 46 used with the present invention cartridge protector 20. The contact spring includes an elongated vertically extending member 48 which forms the contact to the connector module 14. A horizontal extension member 50 extends perpendicularly transverse to the vertical member 48. The horizontal member 50 of the contact spring 46 terminates vertically in a cantilever contact 52 similar to those found on the contacts of the ground bar 40. Referring to FIG. 4B, a second spring contact 47 includes a vertical member 49 having an essentially 90 degree bend and then terminating vertically with a cantilever clip 51. The spring contacts 46, 47, as will be understood, are inserted within the housing of the protector cartridge 20, wherein the vertical members 48, 49 make contact internally to contacts within a connector module 14. Pairs of spring contacts 46, 47 will generally couple with a terminal pair connection, for example, the "tip" and "ring" pair of a telephone circuit. The cantilever clips 52, 51 of a pair of spring contacts 46, 47, in turn, couple with the two remaining leads of a single three terminal protection device 30. The ground terminal of the protection device, as mentioned, couples with the cantilever contact 42 of the ground bar 40. The spring contacts 46, 47 will be comprised of a suitable conductive material as with the ground bracket 40 and may, for example, be (silver) plated to provide enhanced conductivity.

Figure 5A:
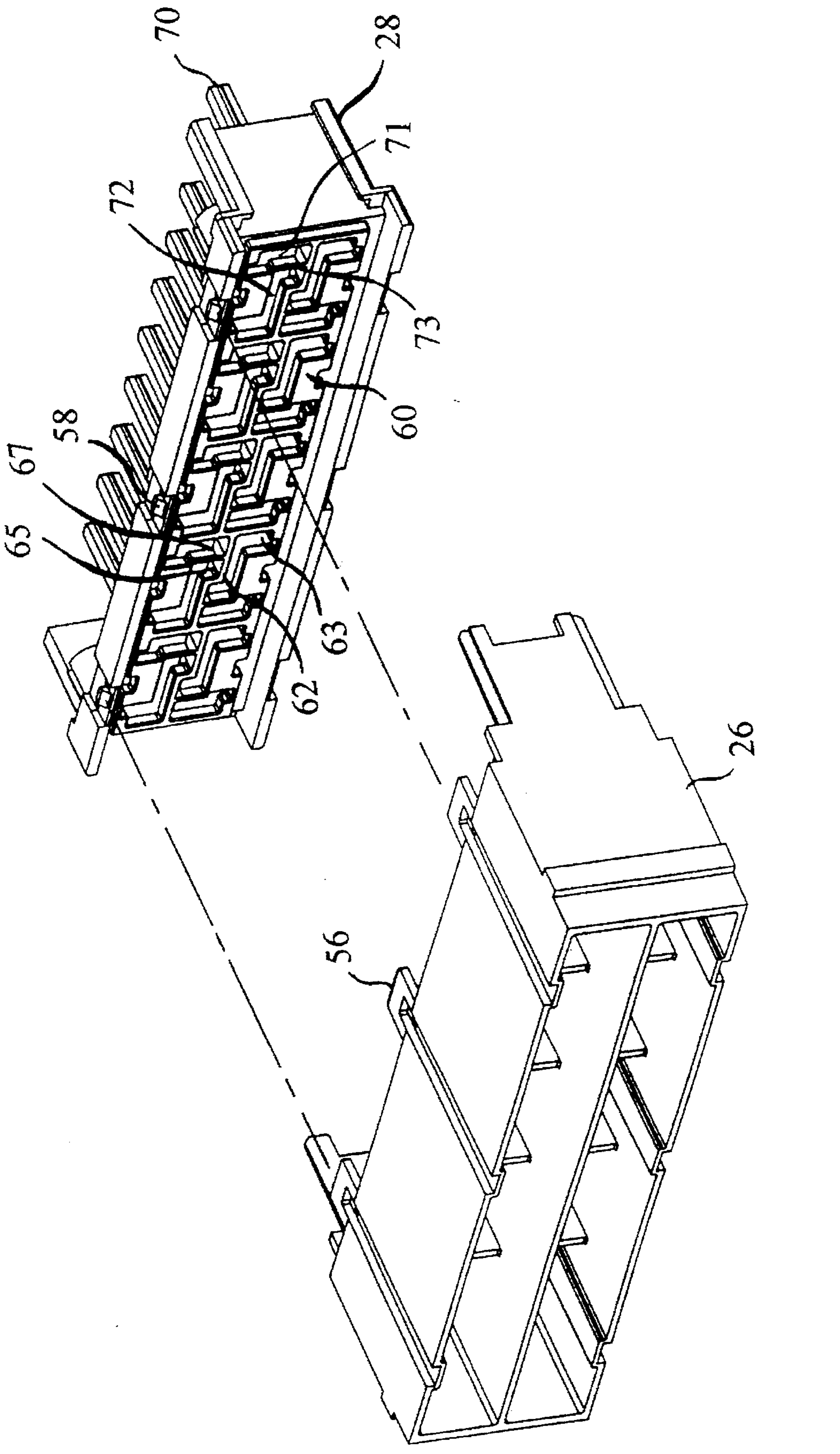
FIG. 5A shows a from perspective view of an upper and lower housing of the present invention protector module.
Figure 5B:
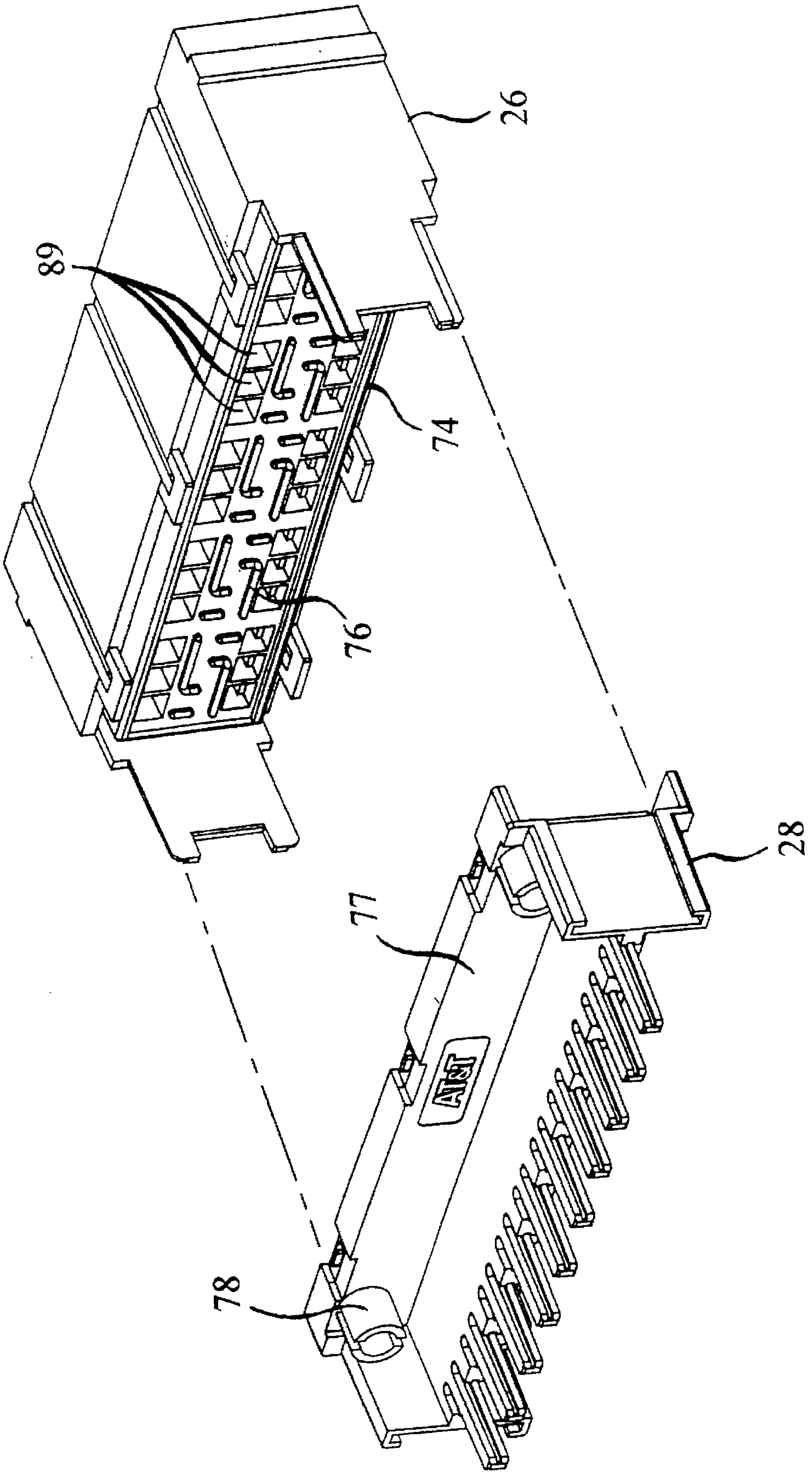
FIG. 5 shows a rear perspective view of an upper and lower housing of the present invention protector module.
FIG. 5C shows a top plan view of the front side of the upper housing of the present invention protector module.

Referring to FIGS. 5A and 5B in conjunction with one another there is shown a front and rear perspective view, respectively, of the upper and lower housing 26, 28 of the protector cartridge 20 as they would connect to one another.

As can be seen, the upper housing 26 includes a plurality of flaps 56 which overhang a bottom edge thereof and are adapted to engage corresponding tabs 58 on the lower housing 28 to thereby couple the two housings. A top surface 60 of the lower housing 28 shown in FIG. 5A includes a plurality of wells 62, 63 for receiving corresponding sections of contact spring 46, 47 respectively. The vertical members 48 of the contact springs 46, 47 are insertable within apertures 65, 67 of the lower housing where they are aligned in a corresponding slot 66 of a finger which extends vertically from the lower housing. The wells 62, 63 are adapted to receive and seat the spring contact 46, 47 wherein adjacent contacts seat within adjacent wells. As can be seen, each pair of spring contacts 46, 47 which correspond to a pair of terminals within a connector module 14 are seated within separate unconnected wells, wherein the shape of the well 62, 63 corresponds to the shape of the corresponding region of the spring contact 46, 47. For example, a first and second spring contact 47, 46 corresponding to the first extending finger 70 of the lower housing 28 would be seated in first and second wells 71, 72, respectively, separated by a partition 73. This serves to significantly increase the insulation resistance between adjacent terminals and also prevents the occurrence of short circuiting of adjacent leads caused by moisture that may collect within the housing when the device is used within humid environments. Any condensation will collect within the separated wells 62, 63 thus preventing electrical contact between terminals caused by collected moisture. The upper and lower housings 26, 28 are adapted to mate with one another with the two L-shaped ground brackets 40 and a predetermined number of spring contacts 46, 47 e.g., 8 or 10 pair, sandwiched between to form the cartridge 20. Final assembly is accomplished by insertion of standard 3-lead commercial configuration protection devices 30, for example, gas tubes including a thermal overload mechanism.

Referring to FIG. 5B, bottom perspective views are shown of the upper and lower housings 26, 28. As can be seen, the bottom facing surface 74 of the upper housing 26 includes a series of protrusions 76 extending outwardly therefrom. The purpose of the protrusions 76 is to engage the spring contacts 46, 47, in order that they may seat correctly within the wells 62, 63 between the upper and lower housing. Also shown in FIG. 5B on the bottom surface 77 of the lower housing 28 is an exclusion feature 78 to prevent insertion of the protector cartridge 20 into certain predetermined sized connector modules 14. For example, the exclusion feature 78 would be present on 8-pair protector modules to prevent an 8-pair cartridge form being inserted into a 10-pair connector module. Besides the exclusion feature 78, the 8-pair and 10-pair protector cartridges use virtually identical components, except that the two pairs of end terminals may be left vacant of protection on the 8-pair module.

Figure 6:
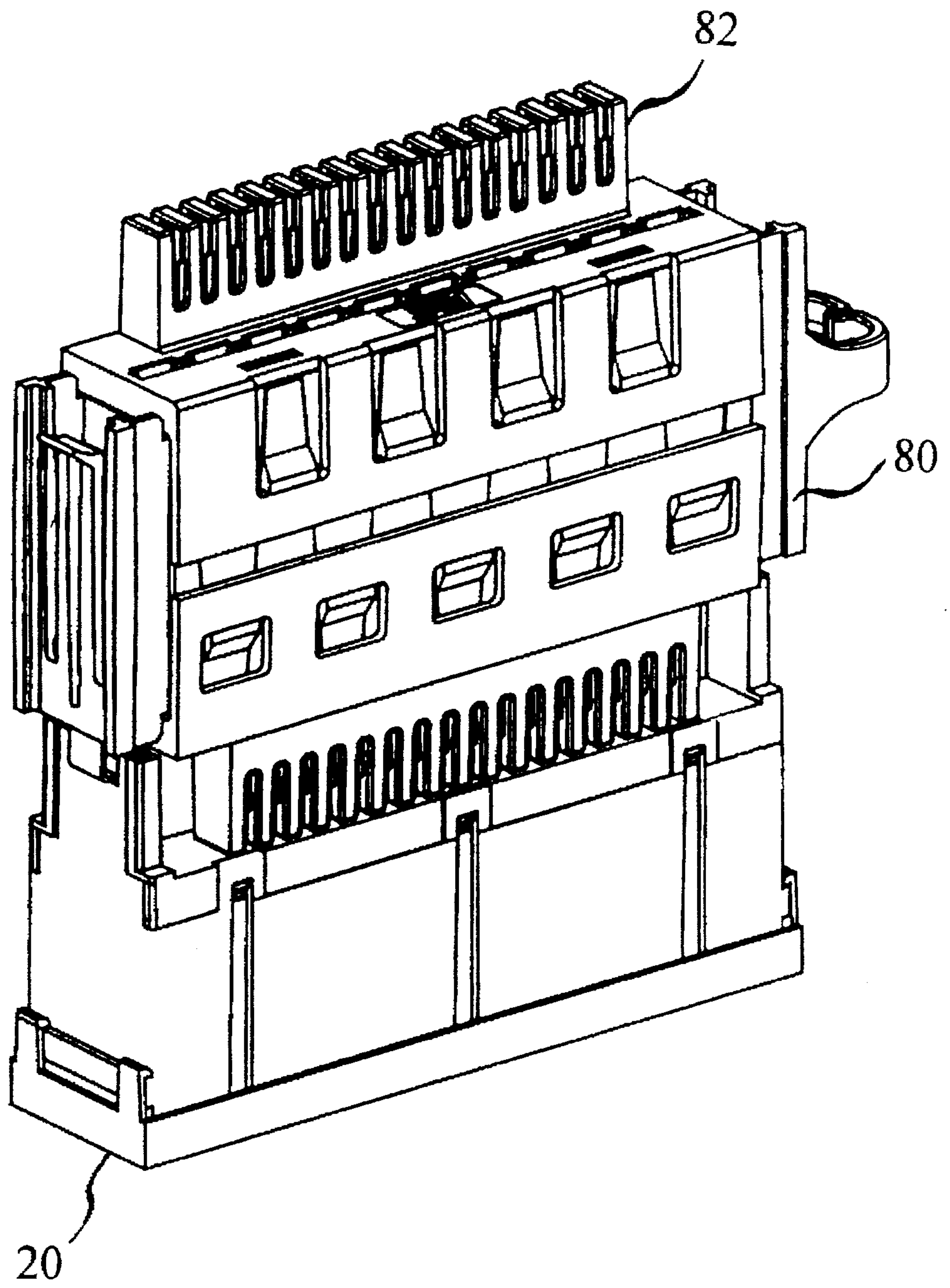
FIG. 6 shows one preferred embodiment of an 8-pair connector module and terminal cap.
Figure 7:
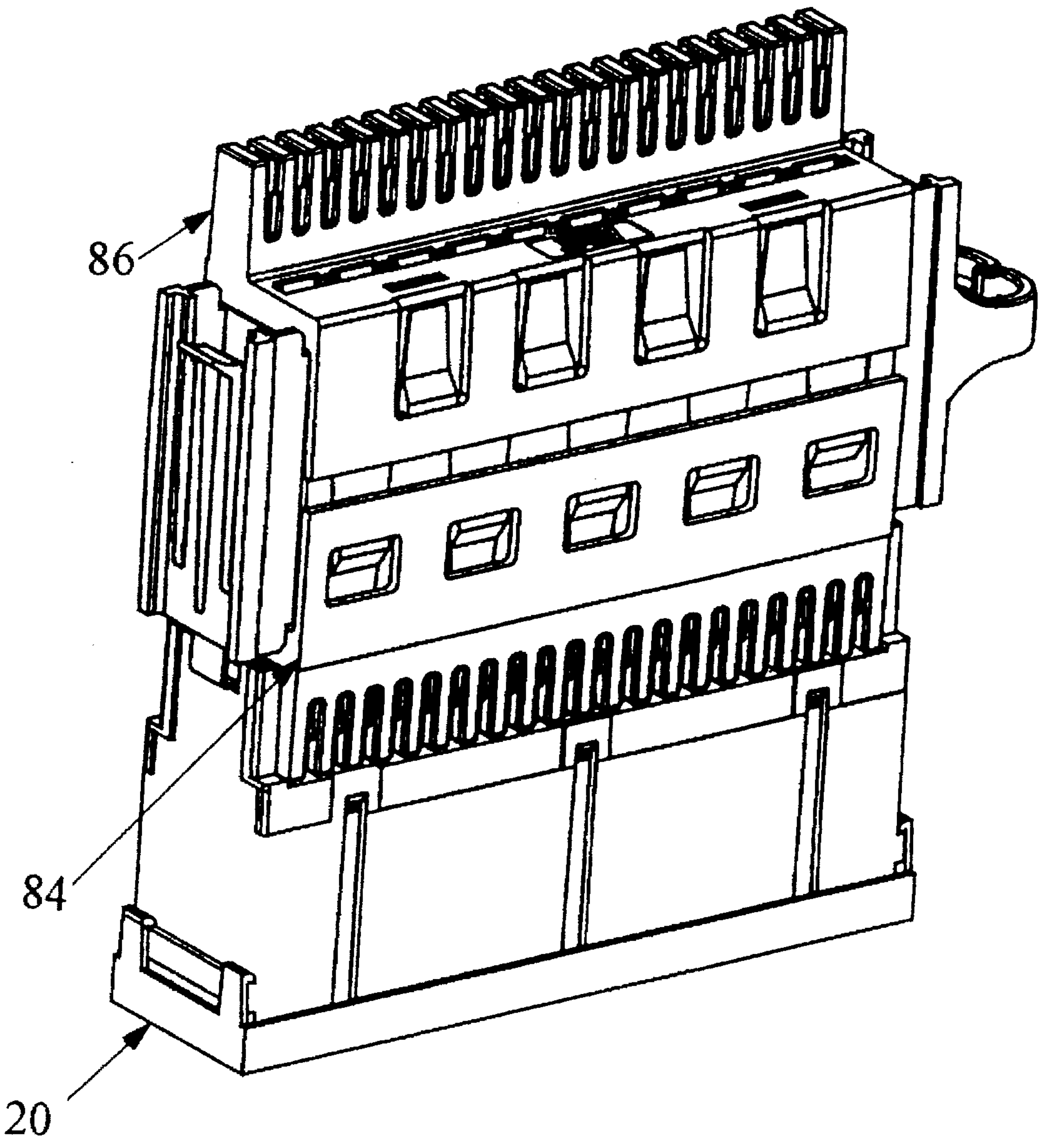
FIG. 7 shows one preferred embodiment of a 10-pair protector module and terminal cap.

FIG. 6 shows an 8-pair connector module 80 with a corresponding 8-pair terminal cap 82 while FIG. 7 shows a similar 10-pair arrangement of connector module 84 and terminal cap 86. As can be seen the terminal cap 86 of the 10-pair connector 84 extends fully across the connector module, while the 8-pair combination 80, 82 of FIG. 6 includes voids on either end. Insertion of an 8-pair cartridge into a 10-pair connector module is thus prevented since the exclusion posts 78 contact the terminals and/or terminal cap 86 at the end regions of the connector module 84 to thereby block full insertion. A 10-pair protection cartridge without exclusion posts is, however, insertable into an 8-pair connector module because no exclusion feature is present to block insertion.

FIG. 5B also illustrates the 10 individual sets of three square apertures 89 present within the upper housing 26. These apertures 89 are adapted for insertion of the cantilever clips 52, 51 on the spring contacts 46, 47 and the clips 42 of the ground bracket 40 which couple with the protection devices 30.

Figure 5C:
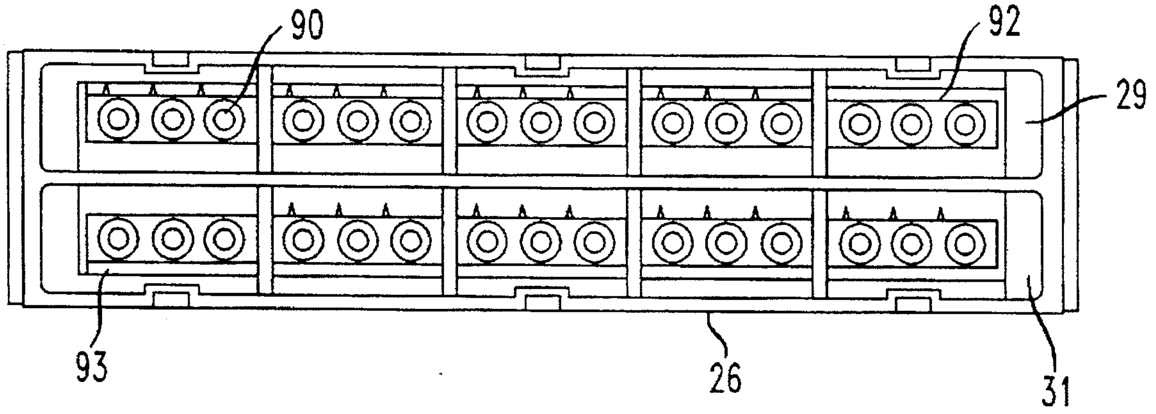

FIG. 5C shows a top plan view of the upper housing 26. Circular retaining regions 90 within the cavities 29, 31 of the upper housing act to stabilize insertion of the protection devices 30 into the cartridge 20. As mentioned previously, identical individual components (with the exception of the removable exclusion feature 78) are used in assembly of the 8 and 10-pair protector cartridges, thereby decreasing overall manufacturing costs. When an 8-pair connector module is desired, the end cavities 92, 93 are simply left unfilled by circuit protection. In the alternative these blank cavities can be used as storage to house spare surge protection devices 30.

Figure 8:
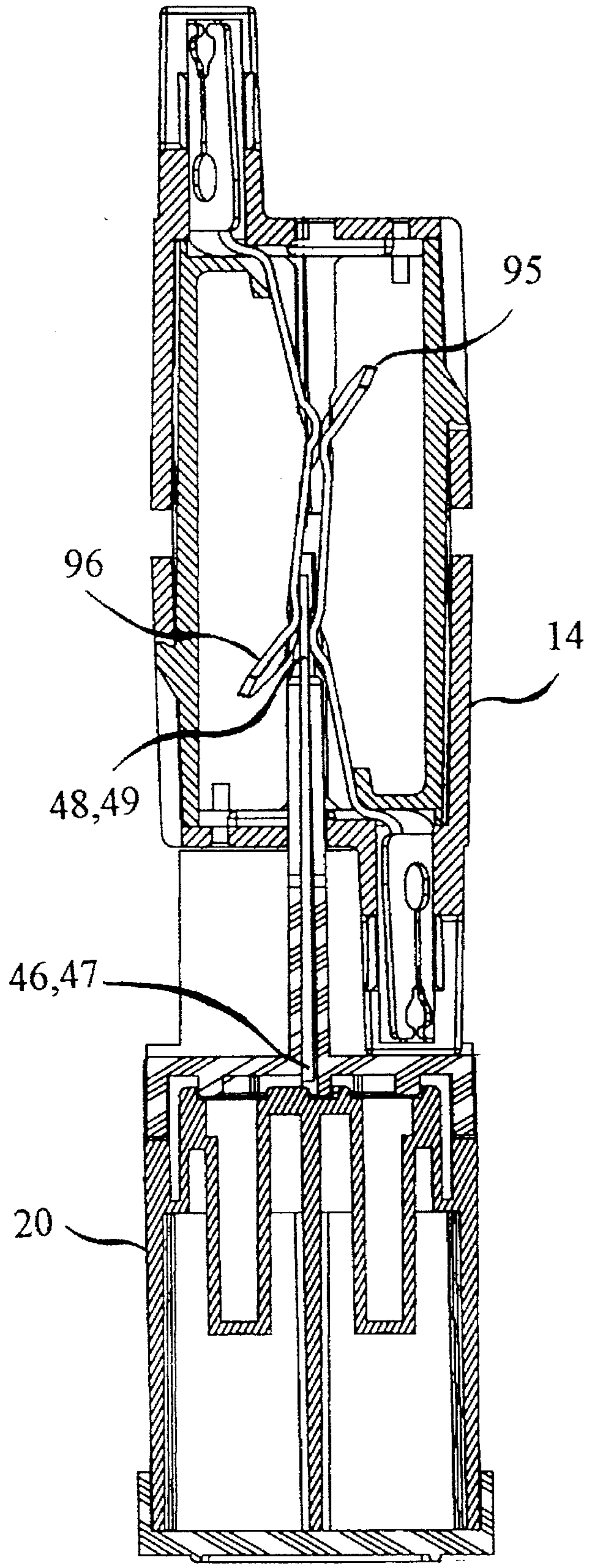
FIG. 8 shows a cross-sectional view of the present invention protector cartridge inserted within a connector module.

Referring to FIG. 8, there is shown a side cross-sectional view of the present invention protector cartridge 20 as it is inserted within a connector module 14. As can be seen, the vertical members 48, 49 of the spring contacts 46 or 47 couple internally with the contacts 95, 96 of the connector module to thereby provide surge protection for contacts at both the front and rear of the module.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A surge protection device for use in a modular connecting block system, wherein connector modules having terminals on front and rear sides thereof are insertable into a mounting bracket to form a connecting block, and wherein said connector modules are adapted to receive voltage limiting circuit protection devices on said front and rear sides of said connector modules for protecting individual pairs of said terminals, said connector modules including a plurality of receptacles corresponding to said individual pairs of said terminals for insertion of said protection devices, said device comprising:

a plurality of conductive terminals adapted for insertion into said receptacles of said connector modules to thereby couple with individual terminals of said connector modules;

an insulated housing adapted to securably mount said plurality of terminals within said housing, said housing further being adapted to accept a plurality of surge protection means for coupling with said plurality of terminals; and a ground bus insertable within said insulated housing and being adapted to couple with said surge protection means and said mounting bracket to thereby provide an electrical discharge path, said device being symmetrical about a central vertical axis and being insertable in said front or rear side of said connector modules in either orientation of a 180 degree rotation about said axis, thereby adaptively mounting within a single one of said connector modules to protect each pair of said terminals therein.

2. The device of claim 1, wherein each of said conductive terminals includes a cantilever connecting clip having first and second leads angled in towards one another, wherein said first and second leads are adapted to exert a predetermined amount of pressure on one another.

3. The device of claim 1, wherein said insulated housing defines a series of cavities therein, said cavities adapted to receive said surge protection means, wherein said protection means, upon insertion into said cavities, rest below a top surface of said housing thereby protecting said protection means from inadvertent handling.

4. The device of claim 1, wherein said insulating housing includes a plurality of vertically extending fingers aligned in a single row, each of said fingers including a first and second slot on opposite sides thereof, wherein said slots are adapted to receive adjacent pairs of said conductive terminals, thereby aligning said terminals for insertion within said connector modules.

5. The device of claim 1, wherein said ground bus includes a first and second L-shaped member, said first and second L-shaped member being oriented opposite one another within said insulated housing to thereby form a rectangular ground bus, each said L-shaped member including an integral tab mechanism for coupling with said mounting bracket and fastening means adapted to couple to terminal leads of said surge protection means.

6. The device of claim 5, wherein said fastening means includes a cantilever connecting clip having first and second leads angled in towards one another, wherein said first and second leads are adapted to exert a predetermined amount of pressure on one another.

7. The device of claim 1, further including a cover for mounting over said insulated housing to thereby protect said protection means.

8. The device of claim 1, wherein said protection means are selected from the group consisting of gas tubes, varistors and solid state protection devices.

9. The device of claim 1, wherein said insulated housing includes a plurality of individual well regions, and wherein individual ones of said conductive terminals of said protection device are adapted to seat within said individual well regions, and wherein adjacent ones of said conductive terminals are separated by a partition positioned between said well regions to thereby maintain sufficient insulation resistance between said terminals.

10. The device of claim 9, wherein said insulating housing comprises an upper housing and a lower housing, said upper and lower housing adapted to mate with one another, wherein said plurality of conductive terminals and said ground bus are securably seated between said upper and lower housing upon assembly of said device.

11. The device of claim 10, wherein said upper housing includes a plurality of protrusions extending downward from a bottom surface of a transverse interior wall, said protrusions adapted to engage said plurality of conductive terminals to thereby force said conductive terminals to seat within said well regions.

12. The device of claim 1, further including exclusion posts located on a base region of said insulated housing, said exclusion posts operative to block installation of said protection device into a connector module of a first predetermined size and enable insertion of said protection device having sufficient number of protection means into a connector module of a second predetermined size.

13. The device of claim 12, wherein said exclusion posts enable insertion of a 10-pair protection device into an 8-pair connector module and prevent insertion of an 8-pair protection device in a 10-pair connector module.

14. The device of claim 13, wherein said 8-pair protection device and said 10-pair protection device include identical components and wherein said exclusion posts are removed from said 10-pair protection device.

15. A voltage surge protection apparatus for use in a modular connecting block system, wherein connector modules having connecting terminals on front and rear sides thereof are insertable into a mounting bracket to form a double sided connecting block, said connector modules including a plurality of apertures on both said from and rear sides adapted for insertion of circuit protection modules, said apparatus comprising:

a plurality of contacts, each of said plurality of contacts corresponding to an individual one of said connecting terminals on said connector module, said contacts being adapted for insertion into receptacles of said connector module to thereby couple to respective ones of said connecting terminals and respective terminals of a surge protection means, a ground bus including a first and second L-shaped member oriented opposite one another in a rectangular configuration, said ground bus including a first fastening means for coupling to support posts of said mounting bracket and second fastening means for coupling to a ground terminals of said protection means, and a common insulated cartridge housing for housing said surge protection means, said cartridge housing also being adapted to securably seat said plurality of contacts and said ground bus therein, wherein said apparatus is insertable in said front or rear side of said connector modules to thereby provide circuit protection to all contacts of a single connector module.

16. The apparatus of claim 15, wherein said insulated housing includes a plurality of individual well regions, and wherein individual ones of said contacts of said protection device are adapted to seat within said individual well regions, and wherein adjacent ones of said contacts are separated by a partition positioned between said well regions to thereby maintain sufficient insulation resistance between said contacts.

17. The apparatus of claim 15, wherein said second fastening means includes a cantilever connecting clip having first and second leads angled in towards one another, wherein said first and second leads are adapted to exert a predetermined amount of pressure on one another.

18. The apparatus of claim 15, wherein each one of said plurality of contacts includes a cantilever connecting clip having first and second leads angled in towards one another, wherein said first and second leads are adapted to exert a predetermined amount of pressure on one another.

19. The apparatus of claim 15, wherein said insulated housing defines a series of cavities therein, said cavities adapted to receive said surge protection means, wherein said protection means, upon insertion into said cavities, rest below a top surface of said housing thereby protecting said protection means from inadvertent handling.

20. The apparatus of claim 15, further including exclusion posts located on a base region of said insulated housing, said exclusion posts operative to block installation of said protection apparatus into a connector module of a first predetermined size and enable insertion of said protection device having sufficient number of protection means into a connector module of a second predetermined size.

* * * * *